(12) United States Patent
Kurasawa et al.

(10) Patent No.: US 12,236,334 B2
(45) Date of Patent: Feb. 25, 2025

(54) FORECASTING DEVICE, METHOD, AND PROGRAM FOR PREDICTING USER FINANCIAL ASSETS AND HEALTH

(71) Applicant: NIPPON TELEGRAPH AND TELEPHONE CORPORATION, Tokyo (JP)

(72) Inventors: Hisashi Kurasawa, Musashino (JP); Shozo Azuma, Musashino (JP); Naoki Asanoma, Musashino (JP); Akihiro Chiba, Musashino (JP); Kana Eguchi, Musashino (JP); Tsutomu Yabuuchi, Musashino (JP); Kazuhiro Yoshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1008 days.

(21) Appl. No.: 17/273,037

(22) PCT Filed: Sep. 4, 2019

(86) PCT No.: PCT/JP2019/034823
§ 371 (c)(1),
(2) Date: Mar. 3, 2021

(87) PCT Pub. No.: WO2020/050327
PCT Pub. Date: Mar. 12, 2020

(65) Prior Publication Data
US 2022/0129734 A1 Apr. 28, 2022

(30) Foreign Application Priority Data
Sep. 5, 2018 (JP) .................. 2018-165705

(51) Int. Cl.
*G06N 3/045* (2023.01)
*G06N 3/08* (2023.01)
*G06Q 40/08* (2012.01)

(52) U.S. Cl.
CPC ............ *G06N 3/045* (2023.01); *G06N 3/08* (2013.01); *G06Q 40/08* (2013.01)

(58) Field of Classification Search
CPC .......... G06N 3/045; G06N 3/08; G06Q 40/08
See application file for complete search history.

(56) References Cited

U.S. PATENT DOCUMENTS

| | | | | |
|---|---|---|---|---|
| 11,270,375 | B1 * | 3/2022 | Jennings | G06N 20/00 |
| 2009/0018969 | A1 * | 1/2009 | Ayres | G06Q 40/00 |
| | | | | 705/36 R |

(Continued)

OTHER PUBLICATIONS

National Cancer Center, About 1.3 times the risk of lung cancer in Japanese due to second-hand smoke, literature, Aug. 31, 2016, https://www.ncc.go.jp/jp/information/pr_release/2016/0831/index. html.

*Primary Examiner* — Alan Chen
(74) *Attorney, Agent, or Firm* — Harness, Dickey & Pierce, P.L.C.

(57) ABSTRACT

A monetary risk prediction apparatus according to an embodiment includes: a predictive model recording unit that records a predictive model to predict time-series data showing a future asset amount of a user; and prediction means for receiving evaluation data that is time-series data including an asset amount and a numeric value showing a health condition of the user, inputting the evaluation data to the predictive model recorded on the predictive model recording unit, and outputting the time-series data showing the future asset amount of the user predicted by the predictive model according to the input.

18 Claims, 9 Drawing Sheets

(56) References Cited

U.S. PATENT DOCUMENTS

2010/0287086 A1* 11/2010 Harris ................. G06F 3/04817
  705/35
2013/0085967 A1* 4/2013 Robb ..................... G06Q 40/10
  705/36 T

* cited by examiner

| DATE AND TIME | ASSET | ASSET MANAGEMENT PLAN | | HEALTH CONDITION | | HEALTH ACTION PLAN | | | | DISEASE RISK | | | |
|---|---|---|---|---|---|---|---|---|---|---|---|---|---|
| | ASSET AMOUNT | DEPOSIT RATE | INVESTMENT RATE | HbA1c | WEIGHT | MEAL | EXERCISE | MEDS | DIABETES | NEPHROPATHY | DIALYSIS | DEATH | |
| 2011.03.22 | 3M | 0.5 | 0.5 | NA | 66.2 | 0 | 0 | 0 | 0 | 0 | 0 | 0 | |
| 2012.07.23 | 3.2M | 0 | 1 | 5.2 | 69.3 | 0 | 0 | 0 | 0 | 0 | 0 | 0 | |
| 2013.10.19 | 3.5M | 0 | 1 | 5.3 | NA | 0 | 0 | 0 | 0 | 0 | 0 | 0 | |
| 2014.04.03 | 3.5M | 0 | 1 | 6.5 | 71.8 | 1 | 0 | 1 | 1 | 0 | 0 | 0 | |
| 2015.07.23 | 4.0M | 0 | 1 | 7.7 | 72.4 | 1 | 0 | 1 | 1 | 1 | 0 | 0 | |
| 2016.10.19 | 3.2M | 1 | 0 | NA | 74.1 | 1 | 1 | 1 | 1 | 1 | 0 | 0 | |
| 2017.04.03 | 2.8M | 1 | 0 | 7.2 | 68.1 | 1 | 1 | 1 | 1 | 1 | 1 | 0 | |
| 2018.02.01 | NA | 1 | 0 | NA | NA | 1 | NA | NA | NA | NA | NA | NA | |
| 2019.03.01 | NA | 0.5 | 0.5 | NA | NA | NA | NA | NA | NA | NA | NA | NA | |

FORECASTING DEVICE, METHOD, AND PROGRAM FOR PREDICTING USER FINANCIAL ASSETS AND HEALTH

CROSS-REFERENCE TO RELATED APPLICATIONS

This application is a 371 U.S. National Phase of International Application No. PCT/JP2019/034823, filed on Sep. 4, 2019, which claims priority to Japanese Application No. 2018-165705 filed on Sep. 5, 2018. The entire disclosures of the above applications are incorporated herein by reference.

TECHNICAL FIELD

Embodiments of the present invention relate to a prediction apparatus, a method, and a program.

BACKGROUND ART

A monetary risk is caused when the balance between an asset and expenditure is lost. The monetary risk is also called a financial risk. As a case in which the monetary risk is easily caused, the development of a disease for which a medical expense far exceeding an asset is required, living in which income after retirement is greatly reduced, or the like is known.

For the purpose of reducing such a monetary risk, various insurance products have been developed and become pervasive. Many people predict monetary risks that they possibly have with reference to general statistical information and select and contract insurance products on the basis of the predicted risks.

Examples of the above general statistical information include an odds ratio showing a disease development risk. The odds ratio is obtained by collecting data until a certain end point, for example, a time at which a disease is developed, dividing the data into groups on the basis of the presence or absence of a factor, and applying a survival analysis to the data. Examples of statistical information include statistical information that makes it possible to quantitatively understand the degree to which the presence or absence of a factor has an influence on a disease development risk (see, for example, NPL 1).

CITATION LIST

Non Patent Literature

[NPL 1] Press Release by National Cancer Center of National Research and Development Agency "*Zyudou Kituen niyoru Nihonzin no Haigan Risuku Yaku* 1.3 *Bai* (Japanese have about 1.3 Times Normal Risk of Developing Lung Cancer under Secondhand Smoke)", Aug. 31, 2016, the Internet <<URL:https://www.ncc.go.jp/jp/information/pr_release/2016/0831/index.html>>

SUMMARY OF THE INVENTION

Technical Problem

However, the odds ratio described above is statistical information calculated on the premise that the degree to which the presence or absence of a factor has an influence does not depend on an elapsed time. Therefore, monetary risks that momentarily change with current and future actions cannot be predicted with fine granularity and sufficient accuracy.

Further, since monetary risks are different depending on disease types or the progress of the seriousness of diseases, it is difficult to predict the monetary risks while comprehensively understanding the disease types and the progress of the seriousness of diseases. For this reason, many people cannot help selecting insurance products that are not obvious as being truly appropriate with reference to general monetary risks although they are not capable of correctly predicting their future monetary risks.

As described above, many people have had difficulties in predicting their future monetary risks with fine granularity and high accuracy. For example, it has been difficult to make a prediction to solve questions about one's future monetary risks such as (1) a question as to whether a future monetary risk is possibly caused, (2) a question about the degree to which money becomes short if the future monetary risk is caused, (3) a question as to whether the monetary risk can be reduced if a lifestyle is improved to make an effort to extend a life span or reduce a disease risk, (4) a question as to whether the future monetary risk can be reduced if a contract with an insurance product is made, and (5) a question about a time at which an asset management plan or a health action plan is changed so that the future monetary risk can be avoided.

The present invention has been made with attention paid to the above circumstances and has an object of providing a prediction apparatus, a method, and a program that properly predict a future monetary risk.

Means for Solving the Problem

In order to achieve the above object, a first aspect of a prediction apparatus according to an embodiment of the present invention includes: a predictive model recording unit that records a predictive model to predict time-series data showing a future asset amount of a user; and prediction means for receiving evaluation data that is time-series data including an asset amount and a numeric value showing a health condition of the user, inputting the evaluation data to the predictive model recorded on the predictive model recording unit, and outputting the time-series data showing the future asset amount of the user predicted by the predictive model according to the input.

A second aspect of the prediction apparatus of the present invention is that, in the first aspect, the predictive model recorded on the predictive model recording unit is a model that predicts the time-series data showing the future asset amount of the user with consideration given to a degree to which the future asset amount of the user and a numeric value showing a future health condition of the user influence each other.

A third aspect of the prediction apparatus of the present invention is that, in the second aspect, the predictive model recorded on the predictive model recording unit is a model that predicts the time-series data showing the future asset amount of the user with consideration given to a degree to which a type of asset management of the user has an influence on the future asset amount of the user and the numeric value showing the future health condition of the user.

A fourth aspect of the prediction apparatus of the present invention is that, in the second aspect, the predictive model recorded on the predictive model recording unit is a model that predicts the time-series data showing the future asset amount of the user with consideration given to a degree to which a type of an action of the user has an influence on the future asset amount of the user and the numeric value showing the future health condition of the user.

A fifth aspect of the prediction apparatus of the present invention is that, in any one of the first to fourth aspects, the prediction apparatus further includes: training data reception means for receiving training data that is time-series data including an asset amount and a numeric value showing a health condition for each user and used to learn the predictive model; a training data recording unit that records the training data received by the training data reception means; and learning means for generating the learned predictive model on the basis of the training data recorded on the training data recording unit.

A sixth aspect of the prediction apparatus of the present invention is that, in any one of the first to fifth aspects, the prediction means outputs data including a result visualizing time-series data of at least one of an asset amount at a time at which the user is predicted to develop a disease and an asset amount at a time at which the user is predicted to die.

A seventh aspect of the prediction apparatus of the present invention is that, in any one of the first to sixth aspects, the predicted time-series data includes a type of future asset management and a type of a future action of the user, and the prediction means outputs data including a result visualizing a difference in the time-series data of the future asset amount before and after at least one of the type of the future asset management and the type of the future action of the user is changed.

An eighth aspect of the prediction apparatus of the present invention is that, in any one of the first to seventh aspects, the predictive model recorded on the predictive model recording unit is a model that predicts the future asset amount of the user with consideration given to a degree to which the type of the asset management and the type of the action of the user have an influence on the future asset amount and the numeric value showing the future health condition, and the prediction means classifies an asset amount corresponding to the type of the asset management into a first element that easily fluctuates depending on an economic situation and a second element that does not easily fluctuate depending on the economic situation in comparison with the first element, classifies an expense necessary for the action into an expense corresponding to a third element that easily fluctuates depending on the economic situation and an expense corresponding to a fourth element that does not easily fluctuate depending on the economic situation in comparison with the third element, and outputs information showing separation between a rate of the asset amount corresponding to the first element to a total of the asset amount and a rate of the expense corresponding to the third element to the expense necessary for the action before the classification.

An aspect of a prediction method according to an embodiment of the present invention is a prediction method performed by a prediction apparatus having a predictive model recording unit that records a predictive model to predict time-series data showing a future asset amount of a user, the prediction method including: receiving evaluation data that is time-series data including an asset amount and a numeric value showing a health condition of the user; inputting the evaluation data to the predictive model recorded on the predictive model recording unit; and outputting the time-series data showing the future asset amount of the user predicted by the predictive model according to the input.

An aspect of a prediction processing program according to an embodiment of the present invention causes a processor to function as the respective means of the prediction apparatus according to any one of the first to eighth aspects.

Effects of the Invention

According to the present invention, it is possible to properly predict a future monetary risk.

DESCRIPTION OF EMBODIMENTS

Hereinafter, an embodiment of the present invention will be described with reference to the drawings.

Point of Embodiment of Present Invention

The future asset of a user fluctuates with the current asset of the user and the future asset management plan of the user. The above current asset can simply be called an asset.

On the other hand, the future expenditure of the user fluctuates with the current health condition of the user and the future health action plan of the user. The current health condition can simply be called a health condition.

Further, the future asset and the future expenditure influence each other. If the future asset and the future expenditure can be predicted with consideration given to the relationship between the future asset and the future expenditure, it is possible to predict when the balance between the future asset and the future expenditure is lost, that is, when a monetary risk is caused with high accuracy.

In an embodiment of the present invention, a risk predictive model is constructed in which the current asset of a user, the future asset management plan of the user, the current health condition of the user, and the future health action plan of the user that momentarily change are received and the future asset amount of the user is predicted to predict a future monetary risk. As a result, the monetary risk is predicted with fine granularity.

Configuration (Hardware Configuration)

Figure 1:
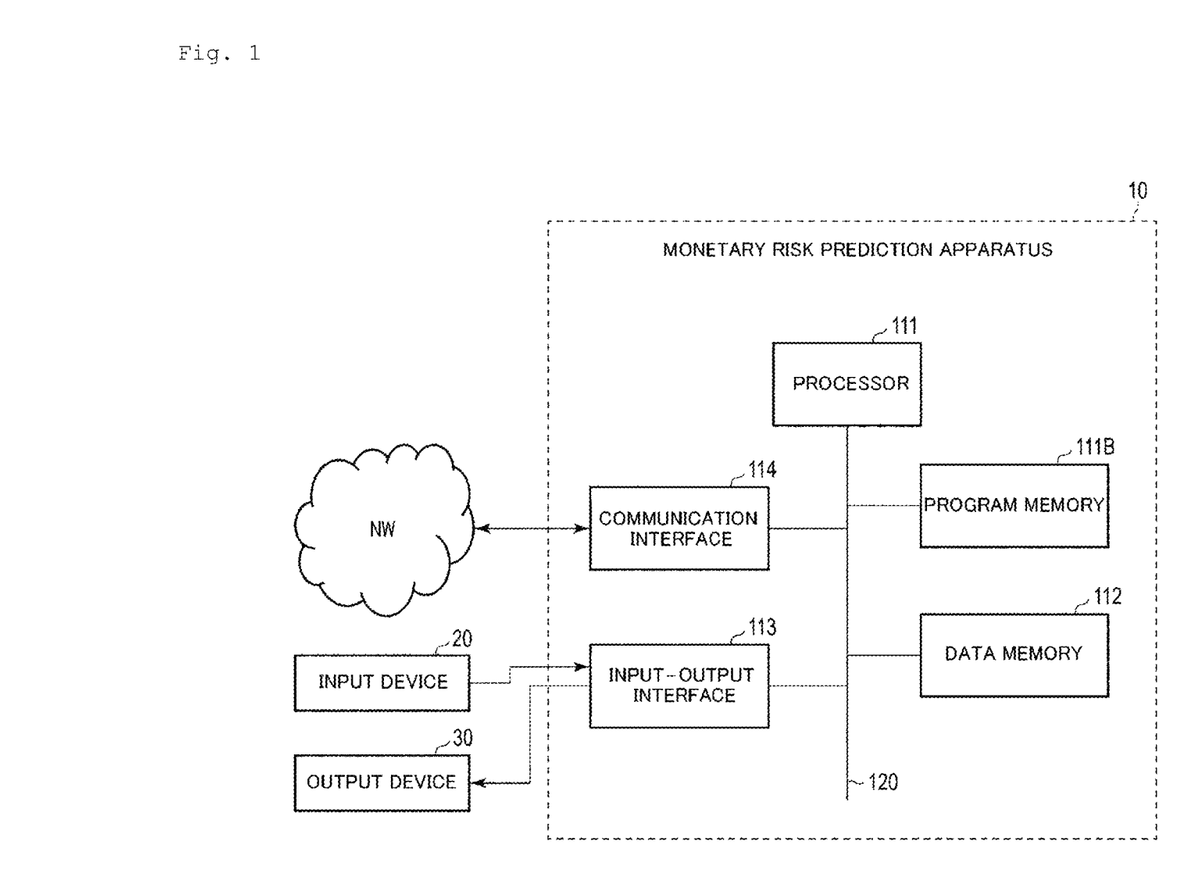
FIG. 1 is a block diagram showing an example of the hardware configuration of a monetary risk prediction apparatus according to an embodiment of the present invention.

FIG. 1 is a block diagram showing an example of the hardware configuration of a monetary risk prediction apparatus 10 according to an embodiment of the present invention.

The monetary risk prediction apparatus 10 is constituted by, for example, a server computer or a personal computer and has a hardware processor 111A such as a CPU (Central Processing Unit). Further, a program memory 111B, a data memory 112, an input-output interface 113, and a communication interface 114 are connected to the hardware processor 111A via a bus 120.

The communication interface 114 includes, for example, one or more wireless communication interfaces and makes it possible to transmit and receive information to and from a communication network NW. As a wireless interface, an interface such as a wireless LAN that employs a small-power wireless data communication standard is used.

An input device 20 and an output device 30 for a manager that are attached to the monetary risk prediction apparatus 10 are connected to the input-output interface 113.

The input-output interface 113 receives operation data input by a manager via the input device 20 such as a keyboard, a touch panel, a touch pad, and a mouse and performs processing to output data to the output device 30 including a display device in which a liquid crystal, an organic EL (Electro Luminescence), or the like is used to be displayed on the output device 30. Note that the input device 20 and the output device 30 may be replaced by devices included in the monetary risk prediction apparatus 10 or an input device and an output device of other information terminals communicable via the network NW.

As a non-transitory substantial storage medium, the program memory 111B is, for example, one in which a non-volatile memory such as a HDD (Hard Disk Drive) and a SSD (Solid State Drive) that makes it possible to perform the writing and reading of information as occasion demands and a non-volatile memory such as a ROM (Read Only Memory) are, for example, used in combination, and stores a program necessary for performing various control processing according to an embodiment.

As a substantial storage medium, the data memory 112 is one in which the above volatile memory and a non-volatile memory such as a RAM (Random Access Memory) are, for example, used in combination, and is used to store various data acquired and created in the process of information collection processing.

(Software Configuration)

Figure 2:
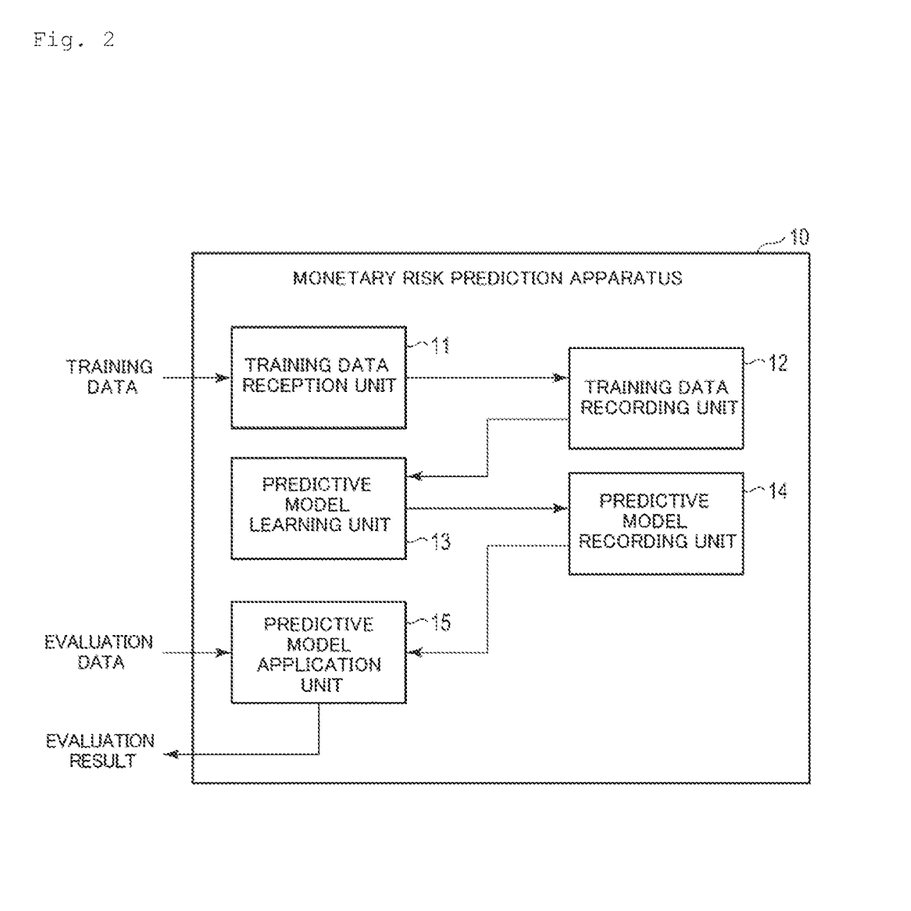
FIG. 2 is a block diagram showing an example of the software configuration of the monetary risk prediction apparatus according to an embodiment of the present invention.

FIG. 2 is a block diagram showing an example of the software configuration of the monetary risk prediction apparatus 10 according to an embodiment of the present invention. In FIG. 2, the software configuration of the monetary risk prediction apparatus 10 is shown in association with the hardware configuration shown in FIG. 1.

As shown in FIG. 2, the monetary risk prediction apparatus 10 according to an embodiment of the present invention can be constituted as a data processing apparatus having a training data reception unit 11, a training data recording unit 12, a predictive model learning unit 13, a predictive model recording unit 14, and a predictive model application unit 15 as software processing function units. The details of the respective units will be described later.

The training data recording unit 12 and the predictive model recording unit 14 inside the monetary risk prediction apparatus 10 shown in FIG. 2 can be constituted by the data memory 112 shown in FIG. 1. However, the training data recording unit 12 and the predictive model recording unit 14 are not necessarily constituted inside the monetary risk prediction apparatus 10 but may be provided in, for example, an external storage medium such as a USB (Universal Serial Bus) memory or a storage device such as a database server arranged in a cloud.

All of the processing function units of the respective units of the above training data reception unit 11, the predictive model learning unit 13, and the predictive model application unit 15 are realized when the above hardware processor 111A is caused to read and perform a program stored in the program memory 111B. Note that a part or all of the processing function units may be realized by various other forms including an integrated circuit such as an ASIC (Application Specific Integrated Circuit) and a FPGA (Field-Programmable Gate Array).

(Recording of Training Data and Construction of Predicting Model)

Figure 3:
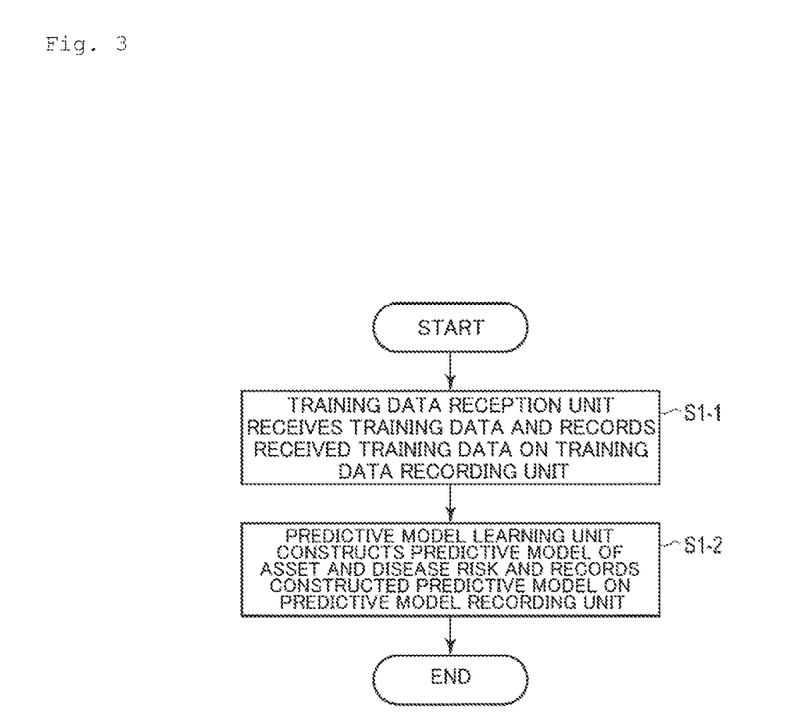
FIG. 3 is a flowchart showing an example of a processing operation concerned with the recording of training data and the construction of a predictive model by the monetary risk prediction apparatus according to an embodiment of the present invention.

FIG. 3 is a flowchart showing an example of a processing operation concerned with the recording of training data and the construction of a predictive model by the monetary risk prediction apparatus 10 according to an embodiment of the present invention.

First, the training data reception unit 11 receives the input of training data from an outside, for example, the network NW via, for example, the input device 20 and records the training data on the training data recording unit 12 (step S1-1). The training data is data used to learn a risk predictive model.

Figure 4:
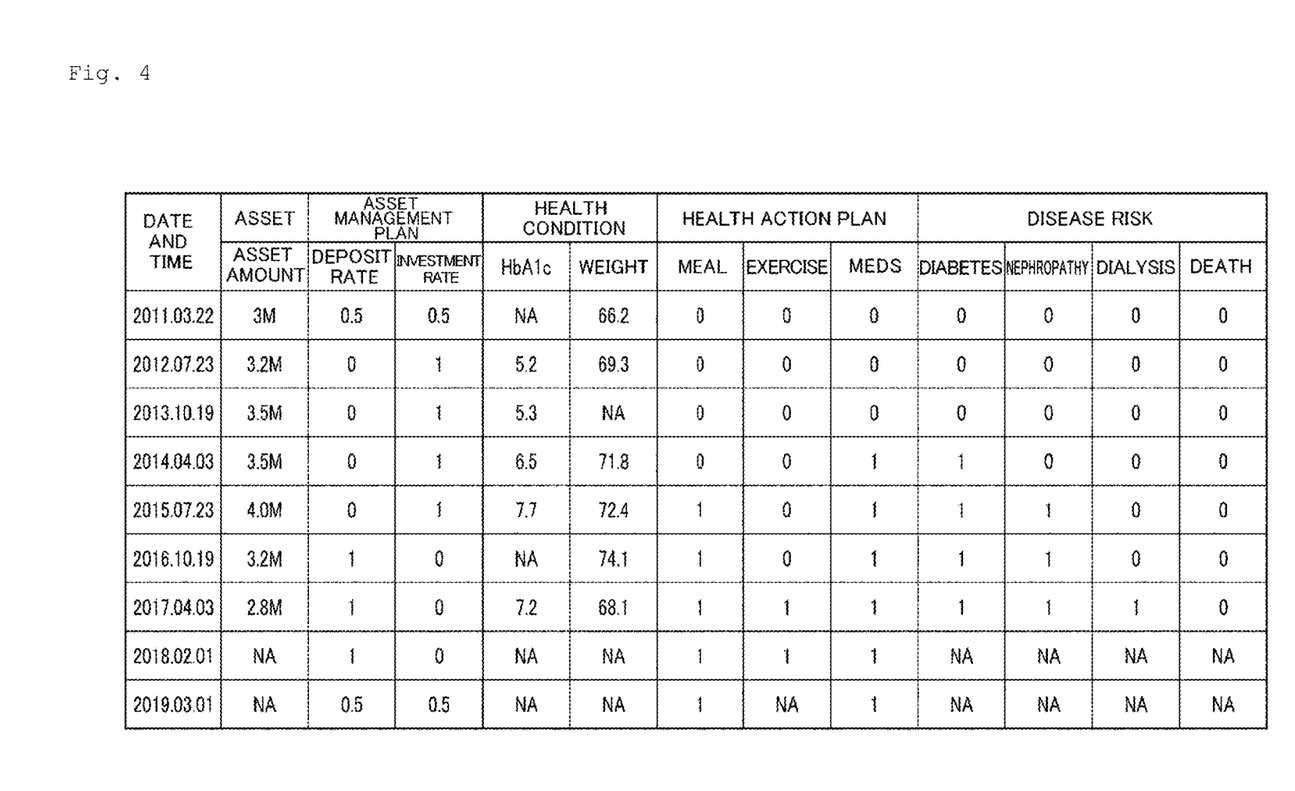
FIG. 4 is a diagram showing, in a table form, an example of training data recorded on the training data recording unit of the monetary risk prediction apparatus according to an embodiment of the present invention.

FIG. 4 is a diagram showing, in a table form, an example of training data recorded on the training data recording unit 12 of the monetary risk prediction apparatus 10 according to an embodiment of the present invention.

As shown in FIG. 4, the training data is time-series data constituted by six major items including a date and time, an asset, an asset management plan, a health condition, a health action plan, and a disease risk for each user. The date and time of the training data may include past, current, and future dates and times, for example, dates. The major items "asset" and "health condition" on the training data represent an asset and a health condition, respectively, in a corresponding date and time on the training data.

In the training data shown in FIG. 4, the minor item of the major item "asset" includes an "asset amount". The minor item "asset amount" represents the current asset amount of a user.

The minor item of the major item "asset management plan" includes a "deposit rate" and an "investment rate". The minor item "deposit rate" represents the rate of a deposit amount to the total of the current and future assets of the user. The minor item "investment rate" represents the rate of an investment amount to the total of the current and future assets of the user.

In the training data shown in FIG. 4, the minor item of the major item "health condition" includes "HbA1c" and a "weight". The minor item "HbA1c" represents current hemoglobin A1c. The minor item "weight" represents the current weight of the user.

In the training data shown in FIG. 4, the minor item of the major item "health action plan" includes a "meal", "exercise", and a "meds".

The minor item "meal" represents the presence or absence of the adoption of a meal plan considering the health of the user. The minor item "exercise" represents the presence or absence of the adoption of an exercise plan considering the health of the user. The minor item "meds" represents the presence or absence of the adoption of a medication treatment plan against a disease that the user currently takes.

When a meal plan considering the health of the user is adopted at a certain date and time with respect to the minor item "meal" of the major item "health action plan", the value of the minor item "meal" concerned with the date and time is set at "1".

On the other hand, when it is assumed that the meal plan considering the health of the user is not adopted at a certain date and time, the value of the minor item "meal" concerned with the date and time is set at "0".

When it is assumed that an exercise plan considering the health of the user is adopted at a certain date and time with respect to the minor item "exercise" of the major item "health action plan", the value of the minor item "exercise" concerned with the date and time is set at "1".

On the other hand, when the exercise plan considering the health is not adopted at a certain date and time, the value of the minor item "exercise" concerned with the date and time is set at "0".

When it is assumed that medication treatment that is medication administration treatment to the user is performed at a certain date and time with respect to the minor item "meds" of the major item "health action plan", the value of the minor item "meds" concerned with the date and time is set at "1".

On the other hand, when it is assumed that the above medication treatment to the user is not performed at a certain date and time, the value of the minor item "meds" concerned with the date and time is set at "0".

In the training data shown in FIG. 4, the minor item of the major item "disease risk" includes "diabetes", "nephropathy", "dialysis", and "death".

The minor item "diabetes" of the major item "disease risk" represents a risk concerned with a time at which the user develops diabetes. The minor item "nephropathy" represents a risk concerned with a time at which the user develops nephropathy. The minor item "dialysis" represents a risk concerned with a time at which dialysis starts when the user takes a disease requiring the dialysis. The minor item "death" represents a risk concerned with the life span of the user.

When it is assumed that the user develops diabetes at a certain date and time with respect to the minor item "diabetes" of the major item "disease risk", the value of the minor item "diabetes" concerned with the date and time is set at "1".

On the other hand, when it is assumed that the user does not develop the diabetes at a certain date and time, the value of the minor item "diabetes" concerned with the date and time is set at "0".

When it is assumed that the user develops nephropathy at a certain date and time with respect to the minor item "nephropathy" of the major item "disease risk, the value of the minor item "nephropathy" concerned with the date and time is set at "1".

On the other hand, when it is assumed that the user does has not develop the nephropathy at a certain date and time, the value of the minor item "nephropathy" concerned with the date and time is set at "0".

When it is assumed that the user dies at a certain date and time with respect the minor item "death" of the major item "disease risk", the value of the minor item "death" concerned with the date and time is set at "1".

On the other hand, when it is assumed that the user does not die at a certain date and time, the value of the minor item "death" concerned with the date and time is set at "0".

The value of the minor item of the major item "asset" on the training data is not limited to the above asset amount but may only include a value such as a deposit amount, an real estate appraisal value, and an stock appraisal value with which a monetary value can be calculated.

The values of the minor item of the major item "asset management plan" on the training data are not limited to the above deposit rate and the investment rate but may only include, for example, values such as the asset management distribution of foreign stocks or domestic stocks and an investment brand with which an asset management degree can be quantitatively expressed for each type. Here, the investment brand is a category variable that is set at "1" when an investment is made in the brand and set at "0" when the investment is not made in the brand.

The values of the minor item of the major item "health condition" on the training data are not limited to the above HbA1c and the weight but may only include, for example, values such as various inspection values concerned with a health condition, a medical history, a prescription medication history, a hospital visiting history, a health check-up result, a daily activity amount, a daily blood pressure value, and a daily meal content with which the health condition can be quantitatively expressed for each type.

The values of the minor item of the major item "health action plan" on the training data are not limited to the values concerned with the above "meal", the "exercise", and the "meds" but may only include, for example, values such as the number of steps, an exercise time, a meal content, and the presence or absence of adequate sleeping with which an action considering health can be quantitatively expressed.

The values of the minor item of the major item "disease risk" on the training data are not limited to the values concerned with the above "diabetes", the "nephropathy", the "dialysis", and the "death" but may only include values with which the symptom of a disease can be defined.

If the values of the minor item include deficits, values expressing deficit values, for example, "NA" is defined in the example of FIG. 4. The deficits correspond to, for example, values that correspond to assets and health conditions in future dates and times or values that correspond to assets and health conditions in past dates and times, and correspond to unknown values or the like.

After step S1-1, the predictive model learning unit 13 constructs (learns) the predictive model of an asset risk and a disease risk on the basis of the training data recorded on the training data recording unit 12 and records the constructed predictive model on the predictive model recording unit 14 (step S1-2). Here, the asset risk represents the risk of reducing an asset amount, and the disease risk represents the risk of a time at which a disease develops or the like.

The asset risk and the disease risk influence each other. Therefore, in the present embodiment, the predictive model of these two types of risks is collectively expressed by a learning device constituted by a multi-layer neural network.

Figure 5:
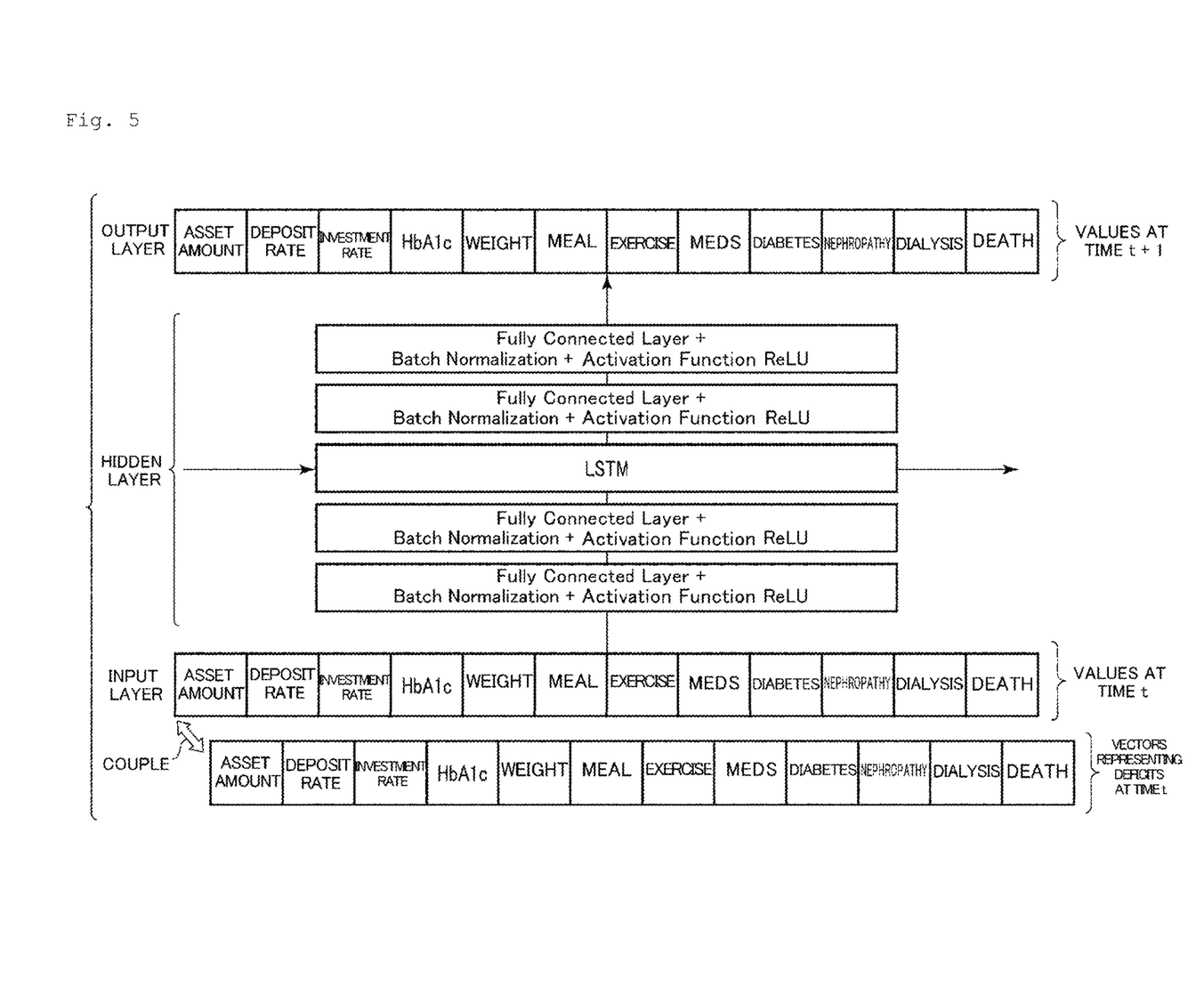
FIG. 5 is a diagram for describing the learning of a predictive model by the monetary risk prediction apparatus according to an embodiment of the present invention.

FIG. 5 is a diagram for describing the learning of a predictive model by the monetary risk prediction apparatus 10 according to an embodiment of the present invention.

FIG. 5 shows an example of a learning device constituted by a multi-layer neural network constituting a predictive model. In the example shown in FIG. 5, the multi-layer neural network is constituted by an input layer, a hidden layer, and an output layer.

Training data recorded on the training data recording unit 12 is used to learn a predictive model.

Data input to the input layer of the multi-layer neural network includes (1) values that show the asset, the asset management plan, the health condition, the health action plan, and the disease risk of the training data at a time t and (2) vectors showing the presence or absence of the deficits of these values at the time t. With respect to the presence or absence of the above deficits, "0" is set when the values do not exist and "1" is set when the values exist.

Data output from the output layer of the multi-layer neural network includes values that are output on the basis of the input data and the parameters of the predictive model and show the asset, the asset management plan, the health condition, the health action plan, and the disease risk of the training data at a time t+1.

In the predictive model, the relationship between a numeric value showing the future asset amount of an individual and a numeric value showing the future health condition of the individual such as a time at which a disease is developed and a life span, for example, asset amounts at a time at which a disease is developed and at the time of death can be predicted with consideration given to the degree to which the future asset amount and the numeric value showing the future health condition influence each other.

In the predictive model, the relationship between the future asset and the future health of an individual can be predicted with consideration given to the degree to which the asset management plan of a user has an influence on each of a future asset amount and a numeric value showing a future health condition such as a time at which a disease is developed and a life span. As a result, a monetary risk can be properly predicted according to, for example, a deposit in an asset and the degree of an investment rate.

Further, in the predictive model, the relationship between the future asset and the future health of an individual can be predicted with consideration given to the degree to which the health action plan of the user has an influence on each of a numeric value showing a future asset amount and a numeric value showing a future health condition. As a result, a monetary risk can be properly predicted according to, for example, a meal considering health and the presence or absence of exercise.

The hidden layer of the multi-layer neural network includes a plurality of layers each constituted by "Fully Connected Layer+Batch Normalization+Activation Function ReLU (Rectified Linear Unit, Rectifier: Rectified Linear Function (also called a ramp function))" and a LSTM (Long Short-Term Memory) between the input layer and the output layer and has a function as a recurrent neural network.

The predictive model learning unit 13 uses a mean squared error in an error function. The predictive model learning unit 13 inputs training data to the input layer and minimizes the error between data output from the output layer and the correct value of the data concerned by Adam (Adaptive moment estimation) that is an optimization method to converge the parameters of the predictive model.

The predictive model reflecting the parameters at this point is recorded on the predictive model recording unit 14 as a learned predictive model. Note that besides the above mean squared error, a cross entropy or a ranking loss based on the magnitude of a risk value may be used in the error function with respect to, for example, a disease development risk. The optimization method is not limited to the Adam but other gradient methods may be used.

The design of the layers of the multi-layer neural network is not limited to the example shown in FIG. 5, but the multi-layer neural network may not function as a recurrent neural network. That is, the layers of the multi-layer neural network may not include the LSTM. Further, the activation function is not limited to the above ReLU but may only be a function with which it is possible to output a risk. The activation function is also called a transfer function.

In the present embodiment, a learned predictive model can receive the input of time-series data including an asset, an asset management plan, a health condition, a health action plan, and a disease risk at a time t and obtain a value at a time t+1 as output (predicted result).

After that, the predictive model inputs the value at the time t+1 obtained as the predicted result and obtains a value at a time t+2 as output. As a result of repeatedly performing such processing, a predicted value at an arbitrary time can be obtained.

That is, when time-series data including a current asset management plan and a current health action plan is input to the predictive model, time-series data including a future asset management plan and a future health action plan can be predicted and output.

If a plan different from a future asset management plan or a future health action plan shown by predicted time-series data is needed to be intentionally set, the following processing is performed.

For example, processing in a case in which at least one of an asset management plan and a health action plan shown by predicted time-series data at a future time t+1 is intentionally changed for the purpose of increasing a future asset amount or preventing the development of a disease will be described.

In this case, after a value shown by the predicted result of an asset management plan and a health action plan shown by the time-series data at the time t+1 obtained when the value of time-series data at a current time t is input to a predictive model is replaced by an intended value by a user, the predictive model learning unit 13 inputs the value to the predictive model and obtain the value of time-series data at a time t+2 as output.

Figure 6:
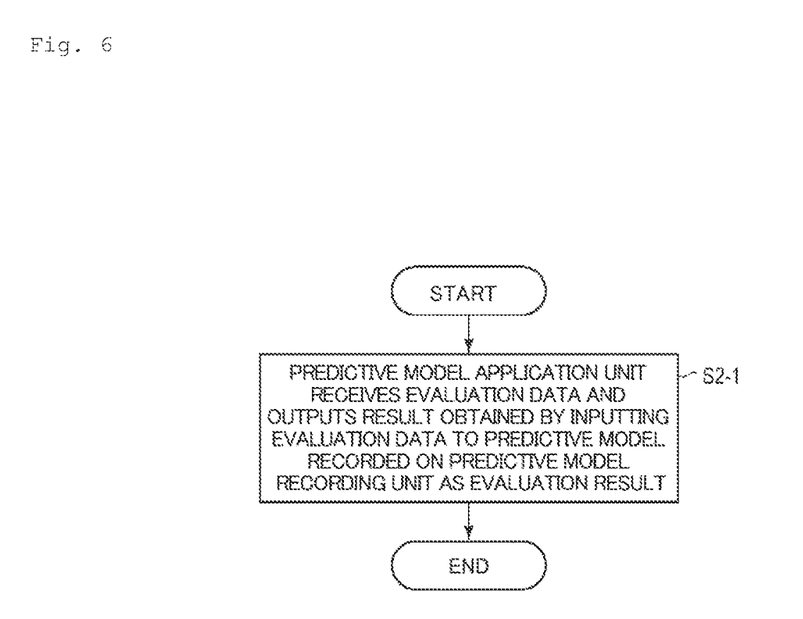
FIG. 6 is a flowchart showing an example of a processing operation concerned with the application of a learned predictive model by the monetary risk prediction apparatus according to an embodiment of the present invention.

FIG. 6 is a flowchart showing an example of a processing operation concerned with the application of a learned predictive model by the monetary risk prediction apparatus 10 according to an embodiment of the present invention.

The predictive model application unit 15 receives, as evaluation data, time-series data constituted by six major items including (1) a date and time, (2) an asset (current asset), (3) an asset management plan (past and current asset management plans, asset management plans predicted or assumed into the future), (4) a health condition (past and current health conditions), (5) a health action plan (past and current health action plans, health action plans predicted or assumed into the future), and (6) a disease risk (past and current diseases, diseases predicted in the future, or the like) related to a user from an outside.

The predictive model application unit 15 reads a learned predictive model recorded on the predictive model recording unit 14 and inputs evaluation data to the input layer of the predictive model. The predictive model application unit 15 outputs a result output from the output layer through calculation based on the parameters of the predictive model as an evaluation result and displays the evaluation result on an external display device not shown (step S2-1).

The evaluation result includes the time-series data of a date and time, an asset (further asset), an asset management plan (asset management plan predicted into the future), a health action plan (health action plan predicted or assumed into the future), and a disease risk (disease predicted in the future or the like) related to the user.

Figure 7:
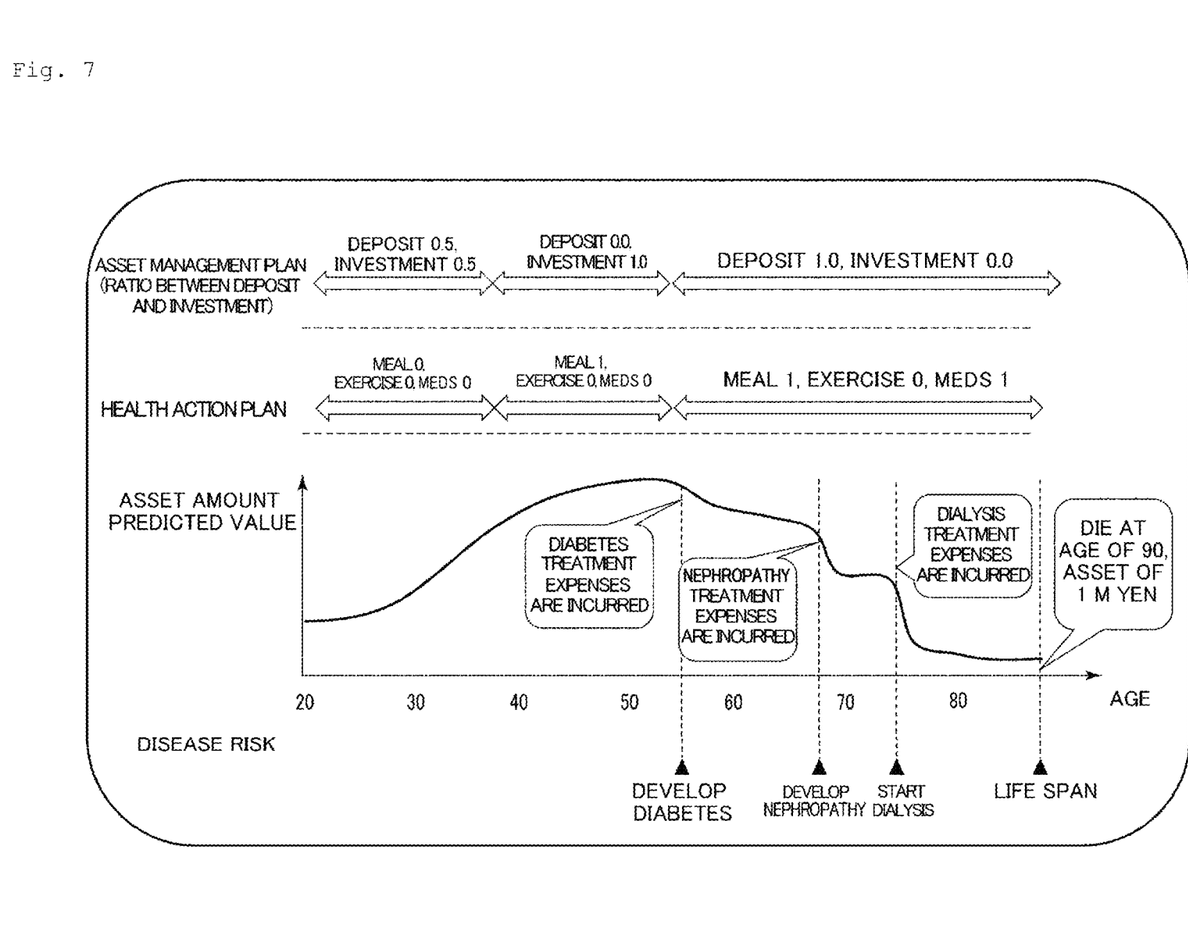
FIG. 7 is a diagram showing an example of an evaluation result output from the monetary risk prediction apparatus according to an embodiment of the present invention.
Figure 8:
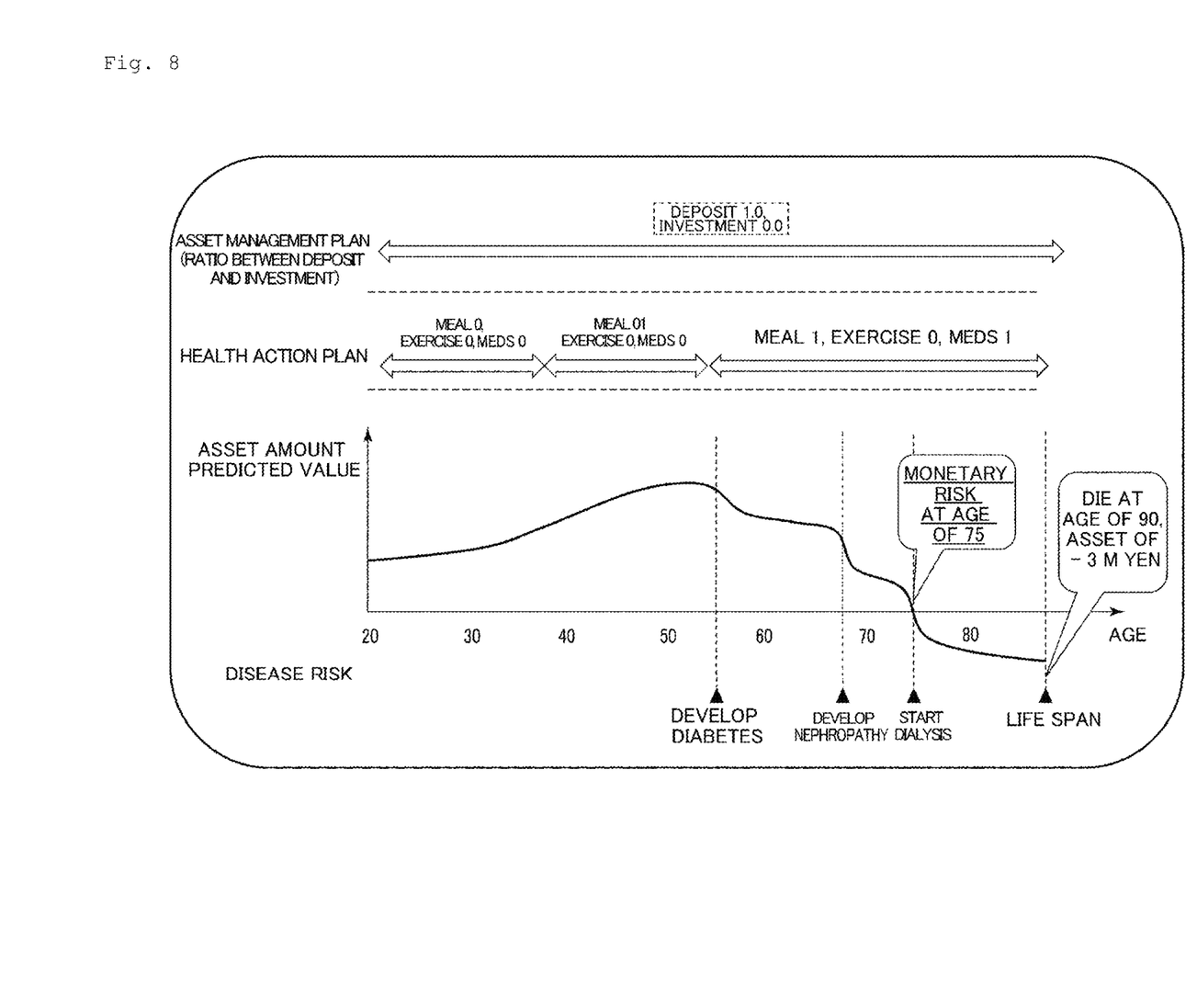
FIG. 8 is a diagram showing an example of an evaluation result output from the monetary risk prediction apparatus according to an embodiment of the present invention.
Figure 9:
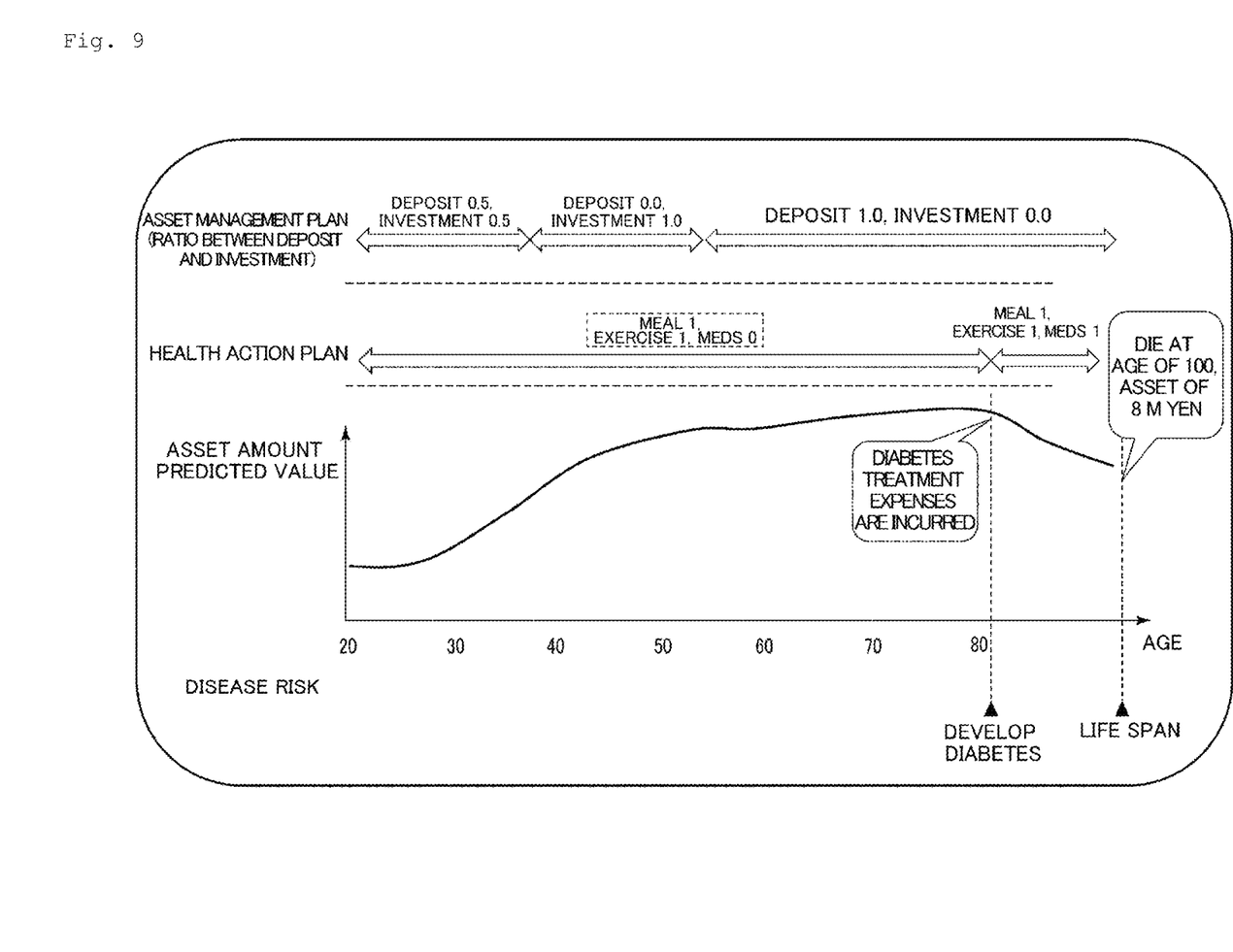
FIG. 9 is a diagram showing an example of an evaluation result output from the monetary risk prediction apparatus according to an embodiment of the present invention.

FIGS. 7, 8, and 9 are diagrams each showing an example of an evaluation result output by the monetary risk prediction apparatus 10 according to an embodiment of the present invention.

FIGS. 7 to 9 show display examples of predicted result notification data visualizing the time-series data of asset amount predicted values at respective times including times at which a user is predicted to develop diseases and a time at which the user is predicted to die in an evaluation result.

In the example of FIG. 7, it is shown that an asset amount predicted value in an evaluation result "reduces with age due to the development of various diseases of the user and the following treatment but a monetary risk is not caused throughout a lifetime since an asset is left at the age of 90 at which the user is predicted to die in his/her bed".

FIG. 8 shows an example of an evaluation result in which an asset management plan shown in FIG. 7 is changed to "deposit=1.0, investment 0.0", that is, a plan in which all income is deposited throughout the lifetime.

The example of FIG. 8 shows a predicted result in which, since an inclination at which an asset amount increases until a time at which the user develops diabetes is gentler than that of the example of FIG. 7, a monetary risk is caused as the user entirely loses his/her asset at the age of 75 and the asset amount becomes remarkably short at the age of 90 at which the user is predicted to die in his/her bed.

FIG. 9 shows an example of an evaluation result in a case in which a health action plan into the future shown in FIG. 7 is changed to "meal=1, exercise=1, meds=0", that is, a plan in which a meal and exercise considering health are taken.

The example of FIG. 9 shows that, since the meal and the exercise considering health are taken as described above, the user does not develop nephropathy and dialysis with age, the age at which the user is predicted to die in his/her bed extends up to the age of 100, the asset amount of the user is left greatly at this point, and a monetary risk is not definitely caused throughout the lifetime.

Besides the above examples, an increase and decrease in a daily weight, an increase and decrease in the number of walking steps, an increase and decrease in an exercise load, and a meal content that show the health conditions of evaluation data may be received as input and reflected in the prediction of a monetary risk.

As described above, a future asset amount is predicted on the basis of a future asset predicted from the current asset and the future asset management plan of a user and a future disease risk predicted from the current health condition and the future health action plan of the user to predict a future monetary risk in the monetary risk prediction apparatus according to an embodiment of the present invention.

According to an embodiment of the present invention, a monetary risk can be verified with consideration given to the relationship between the future asset and the future expenditure of a user. Further, the monetary risk can be verified again on the condition that one or both of a future asset management plan and a future health action plan are changed. That is, when the future monetary risk is predicted, the user can understand, for example, the degree to which one or both of the future asset management plan and the future health action plan are changed to avoid the future monetary risk.

For example, when it is difficult to satisfactorily increase a future asset amount due to the current small asset amount of a user even if any asset management plan is employed into the future, measures such as improving a lifestyle such as a meal and exercise in the future health action plan of the user to reduce a disease development risk and suppress future expenditure to avoid a future monetary risk can be taken.

Further, a user can be urged to change an asset management plan based on the predicted result of a future asset and change a health action plan based on the predicted result of the future asset. For example, when a defined contribution pension plan and a health check-up system are joined together in a company system and a predicted result about a monetary risk is presented to a user, the effect of urging the user to change an asset management plan and a health action plan is expected.

Besides, for example, when a message urging a user having any problem in his/her health condition to change an ordinary food to a low-salt food and the possibilities that the user will have a good influence on a future health condition and achieve long-term asset formation even if the health condition is not improved in a short period of time along with the change are presented to the user, the effect of improving a health action is expected.

(Visualization of Improving or Degrading Tendency of Monetary Risk)

Next, the visualization of the improving or degrading tendency of a monetary risk will be described.

The predictive model application unit 15 may output an evaluation result visualizing a difference in a future asset and future health predicted before and after at least one of the future asset management plan and the future health action plan of a user is changed. As a result, the user can easily understand the fact that a future monetary risk fluctuates with a change in an asset management plan and a health action plan.

(Classification of Asset Management Plan and Classification of Health Action Plan)

Next, the classification of an asset management plan and the classification of a health action plan will be described.

The asset management plan can be classified into an element such as a stock and real estate that is susceptible to an economic situation such as business and an inflation rate and an element such as a deposit that is not susceptible to the economic situation.

Further, an expense necessary for maintaining health can be classified into an element such as an expense for a fitness club and an expense for an expensive healthy food that is susceptible to the economic situation and an element such as an expense for walking that is not susceptible to the economic situation.

Here, it is assumed that the respective elements of the asset management plan and the health action plan in the above training data are classified into business fluctuating elements and business non-fluctuating elements. The business fluctuating elements are elements that easily fluctuate depending on an economic situation. The business non-fluctuating elements are elements that do not easily fluctuate depending on the economic situation.

Specifically, a total asset amount can be classified into an asset amount corresponding to the business fluctuating elements and an asset amount corresponding to the business non-fluctuating elements. Further, a total expense necessary for maintaining health can be classified into the amount of money corresponding to the business fluctuating elements and the amount of money corresponding to the business non-fluctuating elements.

The predictive model application unit 15 can add, to an evaluation result, information that visualizes the separation (difference) between the rate of an asset amount corresponding to the business fluctuating elements to a total asset amount and the rate of the amount of money corresponding to the business fluctuating elements to an expense necessary for a health action plan, that is, an expense necessary for maintaining health.

Further, it is preferable that the ratio of the business fluctuating elements to an expense corresponding to the asset management plan and the ratio of the business fluctuating elements to the expense necessary for maintaining health match each other, that is, the above separation becomes zero.

As described above, when the ratio of the business fluctuating elements to the asset management plan and the ratio of the business fluctuating elements to the expense necessary for maintaining health match each other, an increase in the expense necessary for maintaining health due to the breaking-out of inflation can be cancelled out by an increase in an asset value.

Further, the method described in the respective embodiments can be, as a program (software means) capable of being performed by a calculator (computer), stored in a recording medium such as a magnetic disk (such as a floppy (registered trademark) disk and a hard disk), an optical disc (such as a CD-ROM, a DVD-ROM, and a MO), and a semiconductor memory (such as a ROM, a RAM, and a flash memory) and transmitted via a communication medium to be distributed. Note that the program stored in the medium also includes a setting program for configuring software means (including not only a running program but also a table and a data structure) that is performed by the calculator inside the calculator. The calculator that realizes the present apparatus reads the program recorded on the recording medium, constructs the software means according to the setting program as occasion demands, and controls an operation with the software means to perform the processing described above. Note that the recording medium described in the present specification is not limited to a distributed type but includes a storage medium such as a magnetic disk and a semiconductor memory provided in the calculator or equipment connected via a network.

Note that the present invention is not limited to the above embodiments but is deformable in various ways without departing from its spirit in operation. Further, the respective embodiments may be appropriately combined together to be performed. In this case, the effects of the combinations can be obtained. In addition, the above embodiments include various inventions, and the various inventions can be extracted by the selected combinations of a plurality of disclosed constituting elements. For example, when the problem can be solved and the effects can be obtained even if some of all the constituting elements shown in the embodiments are deleted, configurations from which the constituting elements are deleted can be extracted as inventions.

REFERENCE SIGNS LIST

10 Monetary risk prediction apparatus
11 Training data reception unit
12 Training data recording unit
13 Predictive model learning unit
14 Predictive model recording unit
15 Predictive model application unit

The invention claimed is:

1. A prediction apparatus comprising:
a processor; and
a storage medium having computer program instructions stored thereon, when executed by the processor, perform to:
record a predictive model to predict time-series data showing a future financial asset amount of a user, wherein the predictive model is a neural network;
receive evaluation data that is time-series data including a first numeric value showing a financial asset amount, a second numeric value showing an asset management plan, a third numeric value showing a health condition of the user, a fourth numeric value showing a health action plan, and a fifth numeric value showing a disease risk;
input the evaluation data to the predictive model recorded on a predictive model recording unit; and
output the time-series data showing the future financial asset amount of the user predicted by the predictive model according to the input,
wherein a person inputs the evaluation data to the predictive model through an input device, the processor outputs to a display device the time-series data showing the future financial asset amount, and the person modifies the evaluation data through the input device in response to the output future financial asset amount.

2. The prediction apparatus according to claim 1, wherein the predictive model is a model that predicts the time-series data showing the future financial asset amount of the user with consideration given to a degree to which the future financial asset amount of the user and a numeric value showing a future health condition of the user influence each other.

3. The prediction apparatus according to claim 2, wherein the predictive model is a model that predicts the time-series data showing the future financial asset amount of the user with consideration given to a degree to which a type of asset management of the user has an influence on the future financial asset amount of the user and the numeric value showing the future health condition of the user.

4. The prediction apparatus according to claim 2, wherein the predictive model is a model that predicts the time-series data showing the future financial asset amount of the user with consideration given to a degree to which a type of an action of the user has an influence on the future financial asset amount of the user and the numeric value showing the future health condition of the user.

5. The prediction apparatus according to claim 1 wherein the computer program instruction is further configured to receive training data that is time-series data including a financial asset amount and a numeric value showing a health condition for each user and used to learn the predictive model; records the training data; and generating the learned predictive model on a basis of the training data.

6. The prediction apparatus according to claim 1, wherein the computer program instructions are further configured to output data including a result visualizing time-series data of at least one of a financial asset amount at a time at which the user is predicted to develop a disease and financial asset amount at a time at which the user is predicted to die.

7. The prediction apparatus according to claim 1, wherein the predicted time-series data includes a type of future asset management and a type of a future action of the user, and the computer program instructions further perform output data including a result visualizing a difference in the time-series data of the future financial asset amount before and after at least one of the type of the future asset management and the type of the future action of the user is changed.

8. The prediction apparatus according to claim 1, wherein the predictive model is a model that predicts the future financial asset amount of the user with consideration given to a degree to which the type of the asset management and the type of the action of the user have an influence on the future financial asset amount and the numeric value showing the future health condition, and the computer program instructions are further configured to classify a financial asset amount corresponding to the type of the asset management into a first element that fluctuates depending on an economic situation and a second element that does not fluctuate depending on the economic situation in comparison with the first element, classifies an expense necessary for the action into an expense corresponding to a third element that fluctuates depending on the economic situation and an expense corresponding to a fourth element that does not fluctuate depending on the economic situation in comparison with the third element, and outputs information showing separation between a rate of the asset amount corresponding to the first element to a total of the asset amount and a rate of the expense corresponding to the third element to the expense necessary for the action before the classification.

9. The prediction apparatus according to claim 1, wherein the asset management plan includes (i) a deposit rate, (ii) an investment rate, or both (i) and (ii).

10. The prediction apparatus according to claim 1, wherein the health condition of the user includes (i) a weight, (ii) a measurement of hemoglobin a1c, or both (i) and (ii).

11. The prediction apparatus according to claim 1, wherein the health action plan includes (i) a meal plan, (ii) an exercise plan, (iii) a medicine plan, (iv) a number of steps, (v) an exercise time, (vi) a meal content, (vii) a sleep plan, or combinations thereof.

12. The prediction apparatus according to claim 1, wherein the disease risk includes (i) diabetes, (ii) nephropathy, (iii) dialysis, (iv) death, or combinations thereof.

13. The prediction apparatus according to claim 1, wherein the predictive model includes an input layer, a hidden layer, and an output layer.

14. The prediction apparatus according to claim 13, wherein the input layer includes a first input value corresponding to the financial asset, a second input value corresponding to the asset management plan, a third input value corresponding to the health condition, a fourth input value corresponding to the health action plan, and a fifth input value corresponding to the disease risk, and wherein the first input value, the second input value, the third input value, the fourth input value, and the fifth input value are at a first time (t).

15. The prediction apparatus according to claim 14, wherein the input layer includes a first vector corresponding to the first input value, a second vector corresponding to the second input value, a third vector corresponding to the third input value, a fourth vector corresponding to the fourth input value, and a fifth vector corresponding to the fifth input value, and wherein the first vector, the second vector, the third vector, the fourth vector, and the fifth vector are at the first time (t).

16. The prediction apparatus according to claim 15, wherein the hidden layer is configured to be a recurrent neural network.

17. The prediction apparatus according to claim 16, wherein the output layer includes a first output value corresponding to the financial asset, a second output value corresponding to the asset management plan, a third output value corresponding to the health condition, a fourth output value corresponding to the health action plan, and a fifth output value corresponding to the disease risk, and wherein the first output value, the second output value, the third output value, the fourth output value, and the fifth output value are at a second time (t+1).

18. A prediction method performed by a prediction apparatus having a predictive model recording unit that records a predictive model to predict time-series data showing a future financial asset amount of a user, the prediction method comprising:
receiving evaluation data that is time-series data including a first numeric value showing a financial asset amount, a second numeric value showing an asset management plan, a third numeric value showing a health condition of the user, a fourth numeric value showing a health action plan, and a fifth numeric value showing a disease risk;
inputting, by a person through an input device, the evaluation data to the predictive model recorded on the predictive model recording unit;
outputting, by the prediction apparatus to a display device, the time-series data showing the future financial asset amount of the user predicted by the predictive model according to the input; and
modifying, by the person through the input device, the evaluation data in response to the future financial asset amount,
wherein the predictive model is a neural network.

* * * * *